United States Patent
Wada et al.

(10) Patent No.: US 9,152,525 B2
(45) Date of Patent: Oct. 6, 2015

(54) SERIAL COMMUNICATION DEVICE, SERIAL COMMUNICATION SYSTEM, AND SERIAL COMMUNICATION METHOD

(71) Applicants: Ryuichi Wada, Nagoya (JP); Yuko Ando, Kobe (JP); Ryohei Haga, Kobe (JP)

(72) Inventors: Ryuichi Wada, Nagoya (JP); Yuko Ando, Kobe (JP); Ryohei Haga, Kobe (JP)

(73) Assignees: TOYOTA JIDOSHA KABUSHIKI KAISHA, Aichi-ken (JP); FUJITSU TEN LIMITED, Hyogo-ken (JP)

( * ) Notice: Subject to any disclaimer, the term of this patent is extended or adjusted under 35 U.S.C. 154(b) by 0 days.

(21) Appl. No.: 13/873,634

(22) Filed: Apr. 30, 2013

(65) Prior Publication Data
US 2013/0304947 A1   Nov. 14, 2013

(30) Foreign Application Priority Data
May 8, 2012  (JP) .................................. 2012-106770

(51) Int. Cl.
    G06F 11/30   (2006.01)
(52) U.S. Cl.
    CPC ........ *G06F 11/3048* (2013.01); *G06F 11/3041* (2013.01); *G06F 11/3089* (2013.01); *G06F 11/3013* (2013.01); *G06F 11/3062* (2013.01)
(58) Field of Classification Search
    CPC ............ G06F 11/3013; G06F 11/3041; G06F 11/3048; G06F 11/3062; G06F 11/3089
    USPC .................................................. 710/18, 48, 52
    See application file for complete search history.

(56) References Cited

U.S. PATENT DOCUMENTS

| 5,319,754 | A | * | 6/1994 | Meinecke et al. .............. 710/52 |
| 5,566,351 | A | * | 10/1996 | Crittenden et al. ............. 710/46 |
| 7,154,416 | B1 | * | 12/2006 | Savage ........................... 341/51 |
| 2004/0193756 | A1 | * | 9/2004 | Kamada et al. ................. 710/22 |
| 2008/0273628 | A1 | | 11/2008 | Kurata |
| 2009/0039836 | A1 | * | 2/2009 | Asada ........................... 320/152 |
| 2009/0077277 | A1 | * | 3/2009 | Vidal et al. ..................... 710/46 |

FOREIGN PATENT DOCUMENTS

| JP | 2004295701 A | 10/2004 |
| JP | 2006-018728 A | 1/2006 |
| JP | 2007-150585 A | 6/2007 |
| JP | 2008167303 A | 7/2008 |

* cited by examiner

*Primary Examiner* — Eric Oberly
(74) *Attorney, Agent, or Firm* — Sughrue Mion, PLLC

(57) ABSTRACT

A serial communication device includes: a data transfer unit configured to repeat storing a predetermined unit of data, received by a receiving unit, in a receiving buffer and transfer data to a storage unit when data of a predetermined size is accumulated in the receiving buffer; a counting unit configured to count one of the number of times the predetermined unit of data is stored and an amount of data accumulated; a monitoring unit configured to monitor a count value counted by the counting unit; and a data identifying unit configured to determine that a current interval is a non-communication interval during which a sending source does not send data if the count value remains unchanged for a predetermined time and identify first data, received after the determination of the non-communication interval, as beginning data of a sequence of data including a plurality of pieces of data.

13 Claims, 8 Drawing Sheets

FIG. 4A

| TRANSFER DEVICE | n (Uart) |
|---|---|
| TRANSFER SOURCE ADDRESS | UART (0x100F) |
| TRANSFER DESTINATION ADDRESS | PREDETERMINED AREA IN RAM |
| ADDRESSING MODE | CONSTANT ADDRESS |
| ELEMENT SIZE | 1 BYTE |
| TRANSFER SIZE | 160 BYTES |

FIG. 4B

| RECEPTION THRESHOLD | 1 BYTE |
|---|---|
| MODE (1, 0) | 1 |

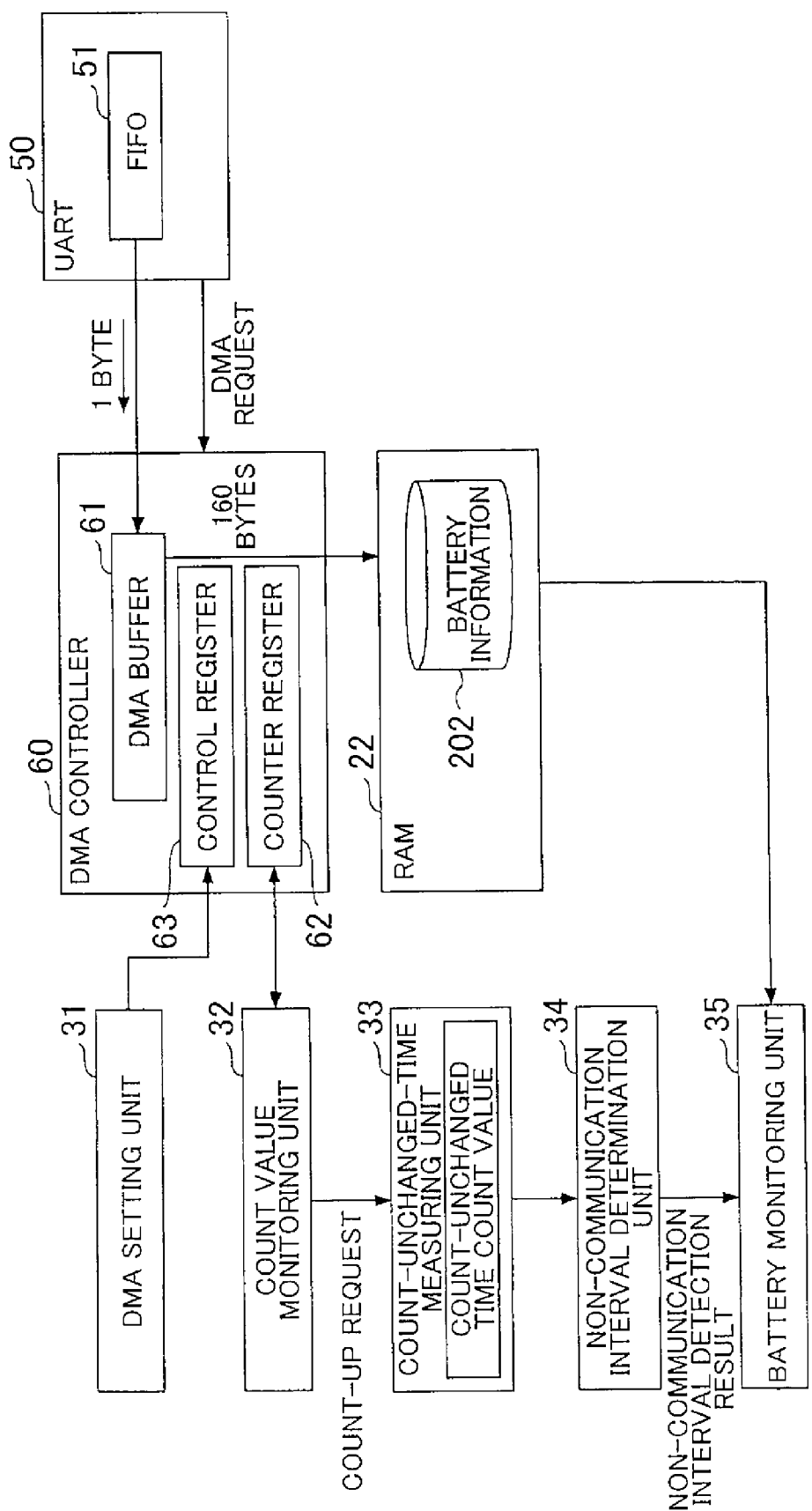

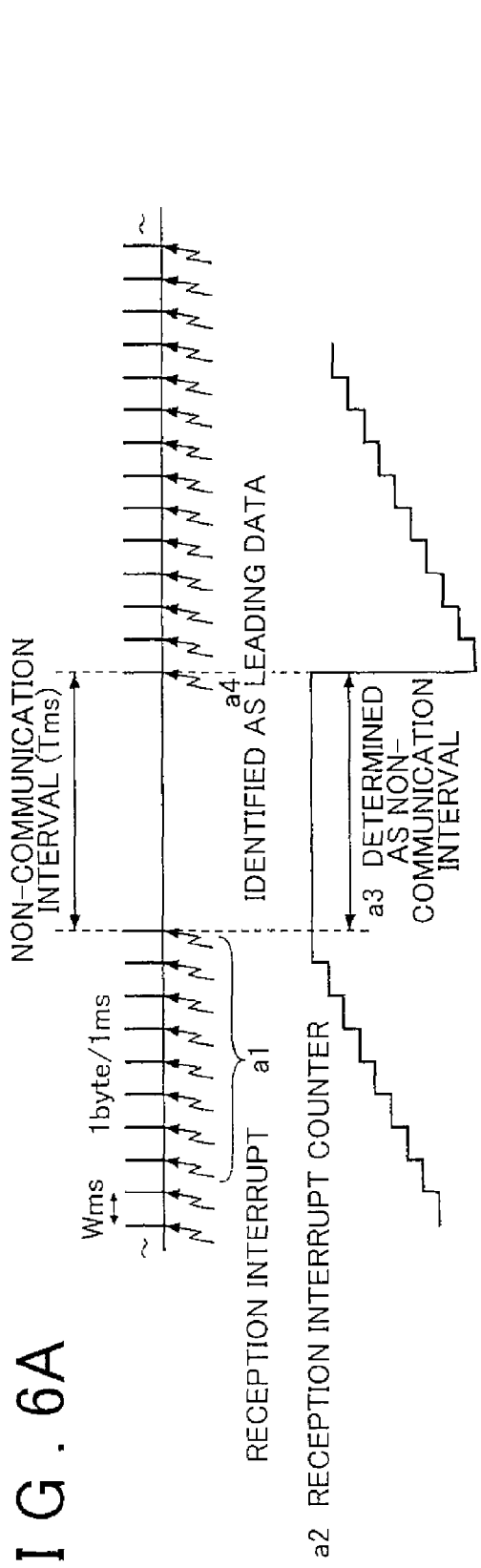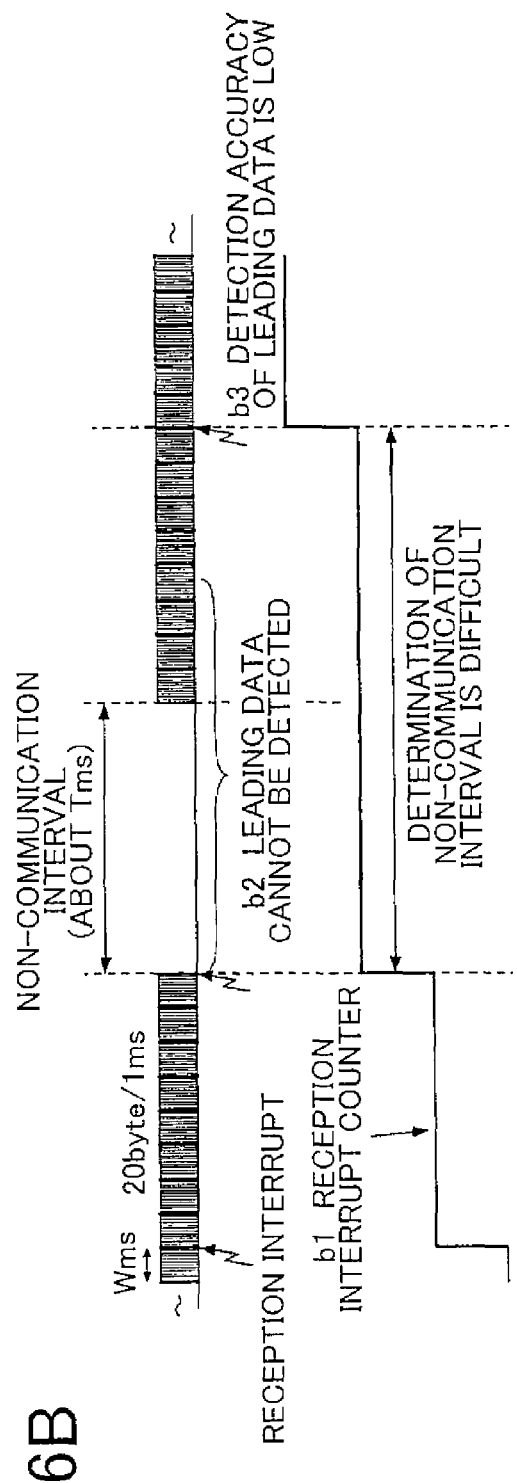

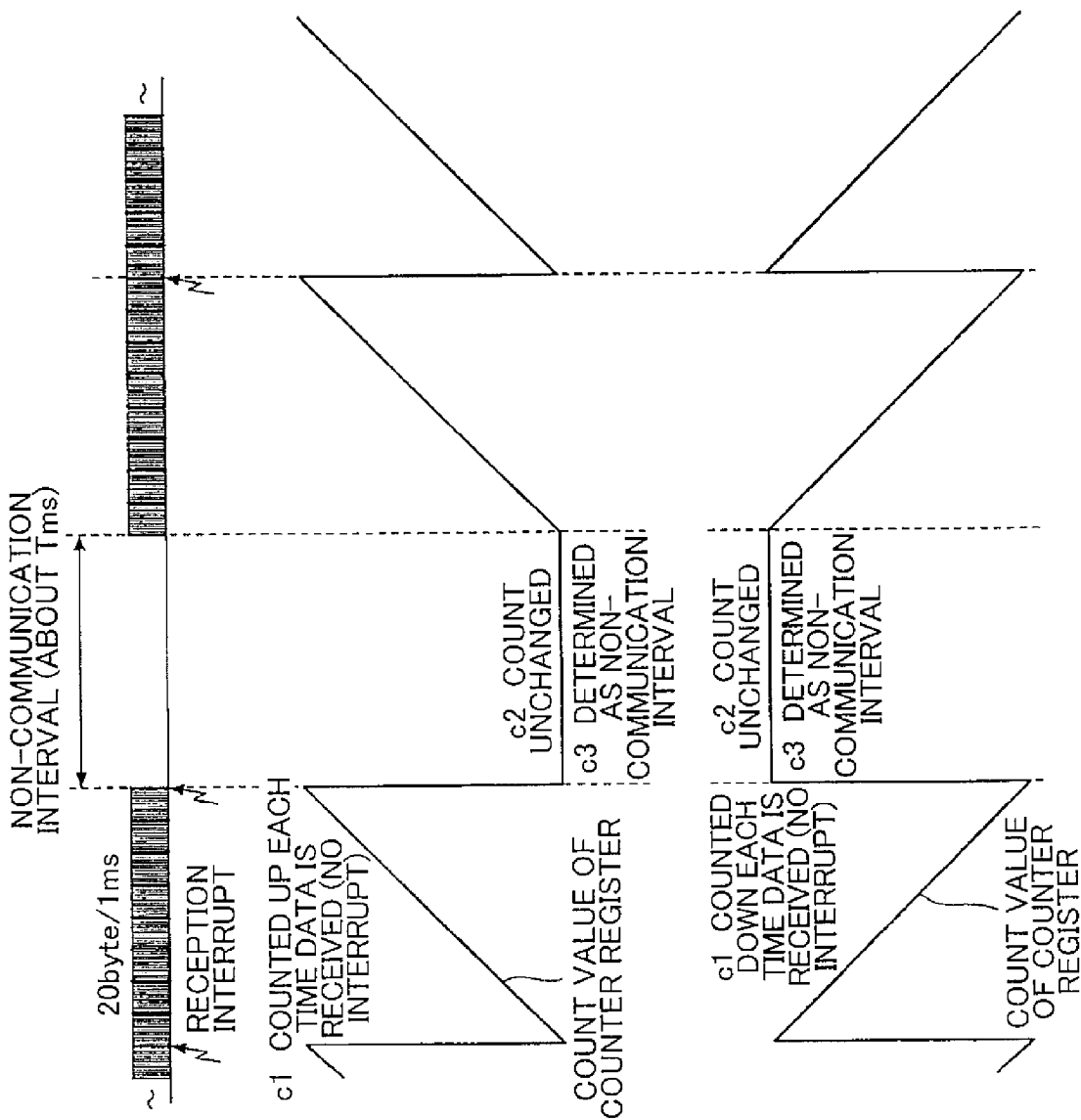

SERIAL COMMUNICATION DEVICE, SERIAL COMMUNICATION SYSTEM, AND SERIAL COMMUNICATION METHOD

INCORPORATION BY REFERENCE

The disclosure of Japanese Patent Application No. 2012-106770 filed on May 8, 2012 including the specification, drawings and abstract is incorporated herein by reference in its entirety.

BACKGROUND OF THE INVENTION

1. Field of the Invention

The present invention relates to a serial communication device, a serial communication system, and a serial communication method that receive data via serial communication from a sending source.

2. Description of Related Art

As a serial communication device, the data transmission/reception device described in Japanese Patent Application Publication No. 2007-150585 is known. This data transmission/reception device recognizes the boundary between the packets as follows. That is, when unit data is sequentially received via a serial communication line, the reception interval between each two pieces of unit data sometimes exceeds the reference time corresponding to a non-communication interval provided in the boundary between the packets. In such a case, the data transmission/reception device recognizes the reception interval as the boundary between the packets.

For example, in the case when the reception interrupt is generated each time one byte of data is received to notify the data reception, the end of a sequence of data can be detected when the reception interrupt is not received for a predetermine time. However, it is sometimes difficult to detect the end of a sequence of data in this method depending upon the frequency at which the reception interrupt is generated.

SUMMARY OF THE INVENTION

The present invention provides a serial communication device, a serial communication system, and a serial communication method that can detect the end of a sequence of data without being affected by the frequency of a reception interrupt.

A first aspect of the present invention relates to a serial communication device. The serial communication device includes: a receiving unit configured to repeatedly receive a sequence of data including a plurality of pieces of data from a sending source; a data transfer unit configured to repeat storing a predetermined unit of data, received by the receiving unit, in a receiving buffer and transfer data from the receiving buffer to a storage unit when data of a predetermined size is accumulated in the receiving buffer; a counting unit configured to count one of a number of times the predetermined unit of data is stored in the receiving buffer and an amount of data accumulated in the receiving buffer; a monitoring unit configured to monitor a count value counted by the counting unit; and a data identifying unit configured to determine that a current interval is a non-communication interval during which the sending source does not send data if the count value remains unchanged for a predetermined time and identify first data, received by the receiving unit after it is determined that the current interval is the non-communication interval, as beginning data of the sequence of data.

A second aspect of the present invention relates to a serial communication system including: a sending device configured to repeatedly send a sequence of data including a plurality of pieces of data with a non-communication interval intervened, the non-communication interval being an interval during which data is not sent; and a receiving device configured to receive the sequence of data sent from the sending device. The receiving device includes: a data transfer unit configured to repeat storing a predetermined unit of data, received from the sending device, in a receiving buffer and transfer data from the receiving buffer to a storage unit when data of a predetermined size is accumulated in the receiving buffer; a counting unit configured to count one of a number of times the predetermined unit of data is stored in the receiving buffer and an amount of data accumulated in the receiving buffer; a monitoring unit configured to monitor a count value counted by the counting unit; and a data identifying unit configured to determine that a current interval is the non-communication interval during which the sending device does not send data if the count value remains unchanged for a predetermined time and identify first data, received by the receiving device after it is determined that the current interval is the non-communication interval, as beginning data of the sequence of data.

A third aspect of the present invention relates to a serial communication method. The serial communication method includes: receiving from a sending source a sequence of data including a plurality of pieces of data repeatedly; repeating storing a predetermined unit of data, received from the sending source, in a receiving buffer; transferring data from the receiving buffer to a storage unit when data of a predetermined size is accumulated in the receiving buffer; counting one of a number of times the predetermined unit of data is stored in the receiving buffer and an amount of accumulated data accumulated in the receiving buffer; monitoring a count value generated by counting the one of the number of times of storing and the amount of accumulated data; determining that a current interval is a non-communication interval during which the sending source does not send data if the count value remains unchanged for a predetermined time; and identifying first data, received after it is determined that the current interval is the non-communication interval, as beginning data of the sequence of data.

The above configurations provides a serial communication device, a serial communication system, and a serial communication method that can detect the end of a sequence of data without being affected by the frequency of a reception interrupt.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 4A and 4B are diagrams showing an example of control information used by a DMA controller and a UART;

FIG. 5 is a diagram showing an example of the functional block of the HV-ECU.

FIGS. 6A and 6B are diagrams showing an example of a conventional non-communication interval detection method illustrated for comparison purposes;

FIGS. 7A and 7B are diagrams showing an example of the non-communication interval detection method in this embodiment.

DETAILED DESCRIPTION OF EMBODIMENTS

The electronic control unit mounted on a hybrid vehicle (HV-ECU) frequently communicates with a battery monitoring unit to monitor the battery state. To reduce the cost, a universal asynchronous receiver transmitter (UART) is used as a communication IC for communication between the HV-ECU and the battery monitoring unit.

Figure 1A:
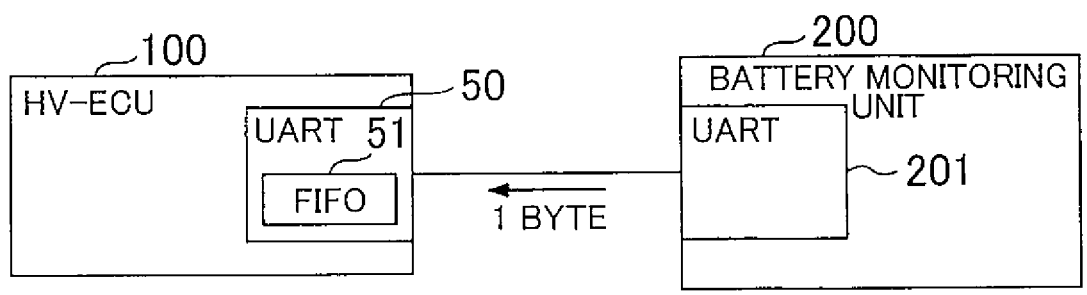
FIGS. 1A and 1B are diagrams showing an example of conventional communication.

FIG. 1A is a diagram showing an example of conventional communication. An HV-ECU 100 and a battery monitoring unit 200 each have a UART as a communication IC (hereinafter called UART 50 and UART 201). The UART 50 and the UART 201 are connected via a transmission line, a reception line, and a ground line. A synchronization line such as a clock line is eliminated to reduce the cost. In addition, the receiving UART does not send an acknowledgement (ACK) or a negative acknowledgement (NAK) to indicate whether data is received successfully. The UART 50 and the UART 201 employ the start-stop (asynchronous) communication method in which eight bits (one byte) between the start bit and the stop bit is one piece of data. The receiving UART 50 (i.e., a UART of the HV-ECU 100 in FIG. 1A) receives data, one byte at a time, and stores the received data in an FIFO 51. Each time one byte of data is received, the UART 50 sends an interrupt to the CPU of the HV-ECU 100 to notify that data is received.

In general, the battery has a structure in which a plurality of battery cells, a plurality of battery stacks, or a plurality of electric cells are connected or combined (hereinafter, the unit cells included in a battery are simply called a cell). Because the UART is capable of processing only one-byte data at a time, the battery monitoring unit 200 cannot send battery information on all cells to the HV-ECU 100 at a time but sends the battery information in multiple transmissions. The number of transmissions required to send all battery information on one battery depends on the number of cells or the amount of battery information on one cell.

It is desirable for the HV-ECU 100 to confirm that the battery information on all cells is received according to the cell arrangement (that is, the battery information is received in the state so that the HV-ECU 100 can identify the correspondence between received battery information and cells). However, as described above, the UART 50 neither performs synchronous communication nor indicates whether data is received successfully.

Accordingly, the battery monitoring unit 200 generates a non-communication interval of a predetermined period (about T milliseconds) after sending all battery information on the battery in one cycle and, after that, starts sending the battery information in the next cycle. Based on whether the amount of battery information from one non-communication interval to the next non-communication interval is constant or whether the predetermined number of data pieces has been received, the HV-ECU 100 confirms that the battery information on all cells has been received according to the cell arrangement. The HV-ECU 100 repeats this communication processing to keep the battery information up-to-date.

The HV-ECU 100 detects a non-communication interval based on the reception interrupt generated each time one byte of data is received. That is, if the reception interrupt is not received for a predetermined period, the HV-ECU 100 detects that the transmission of battery information on the battery will be started when the next first reception interrupt is generated.

The recent improvement in the performance and the material of a battery results in a rapid increase in the amount of battery information per cell. More specifically, a switch in the vehicle-mounted battery from a conventional nickel-metal hydride battery to a lithium-ion battery increases the amount of information the HV-ECU 100 must manage. To solve this problem, a manufacturer has increased the communication speed of the UART 50 and UART 201 several score times so that the battery monitoring unit 200 can send the battery information on the whole battery to the HV-ECU 100 without increasing the communication time.

However, even when the communication speed is changed, the UART 50 sends the reception interrupt to the CPU each time one byte is received. This means that, when the communication speed of the UART 50 and UART 201 is increased several scores times, the number of reception interrupts, which are generated once for W milliseconds (this frequency depends on the communication speed), is also increased several score times. For example, a 20-fold increase in the communication speed results in the generation of reception interrupts as frequently as 20 times for W milliseconds. Note that the relation between T and W is T>>W, for example, T is several times to ten times larger than W. In this manner, simply increasing the communication speed as described above increases the reception interrupt frequency, leading to an increase in the processing load of the HV-ECU 100.

Figure 1B:
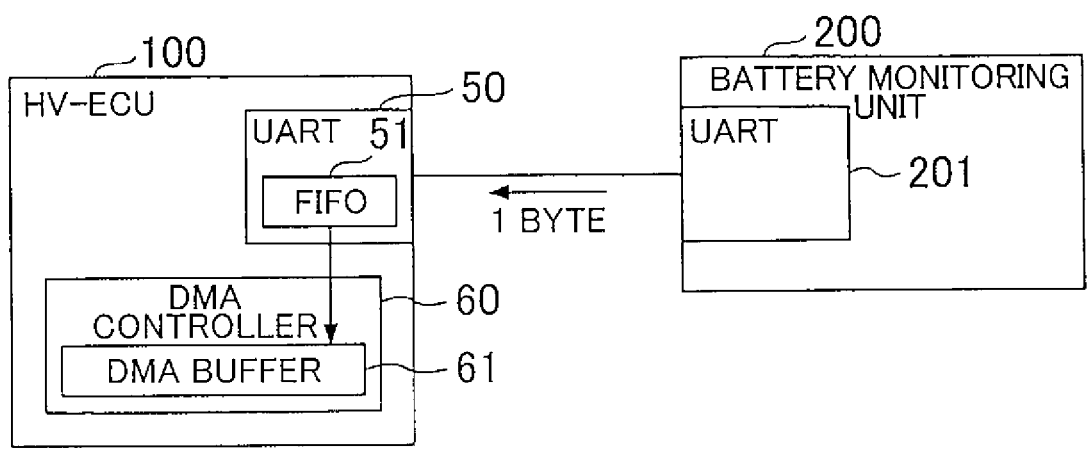

One possible solution to this problem is the addition of the direct memory access (DMA) function to the UART 50. FIG. 1B is a diagram showing an example of the UART communication that uses the DMA function. The HV-ECU 100 has a DMA controller 60. The DMA controller 60 is an IC that, when data of the transfer size that is set in a register, is stored in a DMA buffer 61, transfers the data from the DMA buffer 61 to the RAM or the like and sends the reception interrupt to the CPU. The transfer size, which is set in the DMA controller 60, is determined based on the communication speed so that the reception interrupt is generated at an appropriate frequency (for example, once for T milliseconds). This configuration allows the I-IV-ECU 100, where the UART 50 is used as before, to receive much battery information per unit time and therefore prevent the processing load from being increased due to an increase in the number of reception interrupts.

However, when a reception interrupt occurs less frequently, another problem is generated that the HV-ECU 100 cannot detect a non-communication interval. The non-communication interval is assumed to be about T milliseconds. If the reception interrupt is generated once for W milliseconds as in the conventional communication, the HV-ECU 100 is only required to detect that no reception interrupt is generated within the time during which the reception interrupt should be generated T/W times. Therefore, the HV-ECU 100 can detect, with sufficient time allowance, that there is no reception interrupt in a relatively reliable manner.

On the other hand, if the reception interrupt is generated once for T milliseconds, the reception interrupt is generated at most once in the non-communication interval. In this case, it is difficult to detect that there is no reception interrupt. Extending the non-communication interval makes it easier to detect the non-communication interval because the number of reception interrupts that should be counted in the non-communication interval is increased. However, extending the non-communication interval decreases the data transfer efficiency.

Another possible solution is to increase the reception interrupt frequency (for example, W-millisecond interval as in the conventional communication). However, because the HV-ECU 100 performs much processing, it is not desirable to carry out communication in which the reception interrupt is generated as frequently as in the conventional communication. This is because increasing the reception interrupt frequency may sometimes create a new inconvenience, for example, a high-performance CPU will be needed.

Figure 2A:
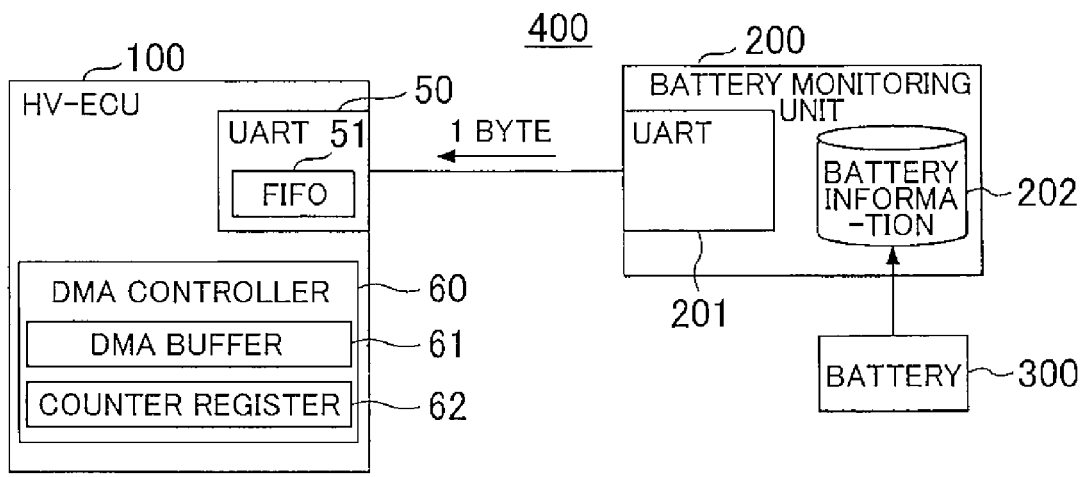
FIGS. 2A-2C are diagrams showing an example of the outline of the non-communication interval detection procedure used by an HV-ECU in this embodiment.
Figure 2B:
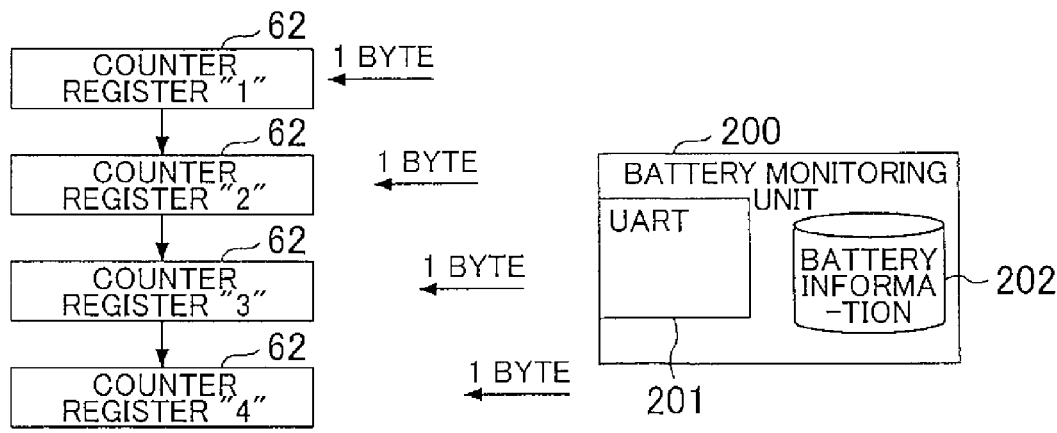
Figure 2C:
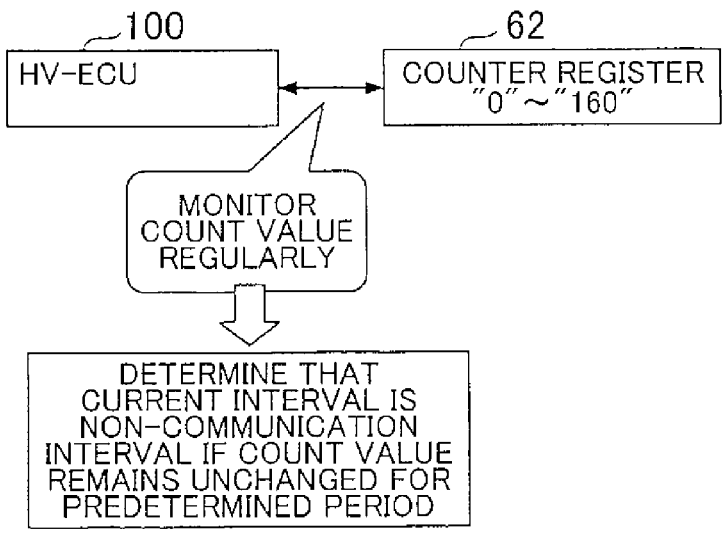

To address this problem, the present invention provides a serial communication device, a serial communication system, and a serial communication method capable of detecting the end of a sequence of data without being affected by the reception interrupt frequency. The following describes an embodiment, in which the present invention is carried out, with reference to the drawings. FIGS. 2A-2C are diagrams showing an example of the outline of the procedure used by an HV-ECU 100 in this embodiment to detect a non-communication interval. In this embodiment, a non-communication interval is detected by using a receiving buffer counter register 62 (hereinafter simply called a counter register 62) included in a DMA controller 60. In this embodiment, a system including the HV-ECU 100 and a battery monitoring unit 200 is called an electronic monitoring system 400. In some cases, the electronic monitoring system 400 further includes a battery 300.

As shown in FIG. 2A, when battery information 202 is received from a UART 201 of the battery monitoring unit 200, a UART 50 of the HV-ECU 100 stores the received data in an FIFO 51 and sends a DMA request to the DMA controller 60. In this case, the UART 50 sends the DMA request to the DMA controller 60, once for one byte. Upon detecting the DMA request, the DMA controller 60 receives one-byte battery information 202 from the UART 50 and stores the received battery information 202 in a DMA buffer 61. That is, the DMA controller 60 repeats storing one-byte battery information 202 in a DMA buffer 61. The transfer size (for example, 160 bytes) is set in advance in the DMA controller 60. Accordingly, the DMA controller 60 does not transfer the battery information 202 to the RAM until the 160 bytes of battery information 202 is accumulated in the DMA buffer 61.

As shown in FIG. 2B, the DMA controller 60 uses the counter register 62 to count the number of times data is stored in the DMA buffer 61. Note that the DMA controller 60 may use the counter register 62 to count, not the number of times data is stored, but the amount data stored in the DMA buffer 61. Therefore, each time one byte is received, the count value of the counter register 62 is incremented by one. A reception interrupt to the CPU of the HV-ECU 100 is not generated until 160 bytes of battery information 202 is received in the DMA buffer 61.

As shown in FIG. 2C, the HV-ECU 100 regularly monitors the count value of the counter register 62. The count value changes (for example, increases) at approximately constant speed during an interval other than the non-communication interval. This means that, if the count value does not change (the count value remains unchanged) for a predetermined period, it is determined that a current interval is the non-communication interval.

Therefore, even if the interval at which the reception interrupt is generated and the non-communication interval are approximately equal in length, the HV-ECU 100 in this embodiment can detect the non-communication interval more accurately by monitoring the count value of the counter register 62 in the DMA controller 60.

Although an example of communication between the HV-ECU 100 and the battery monitoring unit 200 is described in this embodiment, the non-communication interval detection method shown in FIGS. 2A-2C is applicable to a system composed of a unit, which sends data with a non-communication interval intervened, and an ECU that receives data with a non-communication interval intervened. Therefore, the ECU is not limited to the HV-ECU 100, but any ECU such as the engine ECU, brake ECU, transmission ECU, and navigation ECU may be used. Similarly, the unit is not limited to the battery monitoring unit 200, but various units may be used. The receiving unit need not be an ECU and, even when the battery control unit is a receiving unit, the non-communication interval detection method in this embodiment is applicable.

First, the following briefly describes the HV-ECU 100. The HV-ECU 100 determines an engine output and a motor output based on the driver's output request and the battery information 202 and requests the engine ECU and the motor ECU to control the engine output and the motor output respectively. For example, the HV-ECU 100 performs the following processing.

(i) Acquires the accelerator opening degree, vehicle speed information, shift-lever position, brake pedal depression state, and the battery information 202.

(ii) Determines the request output from the accelerator opening degree and the vehicle speed by referencing the map in which the request output is set in association with the accelerator opening degree and the vehicle speed. After that, the HV-ECU 100 determines the engine output (engine rotation speed and torque) by referencing optimum fuel efficiency line so that the driving force corresponding to this request output is output to the ring gear.

(iii) Determines the motor output, which should be added by the motor, from the request output and the engine output. After that, the HV-ECU 100 determines the motor rotation speed that gives this motor output.

(iv) Sends the engine output to the engine ECU and sends the motor output, including the motor rotation speed, to the motor ECU.

In this manner, the HV-ECU 100 optimally controls the engine and the motor.

Figure 3:
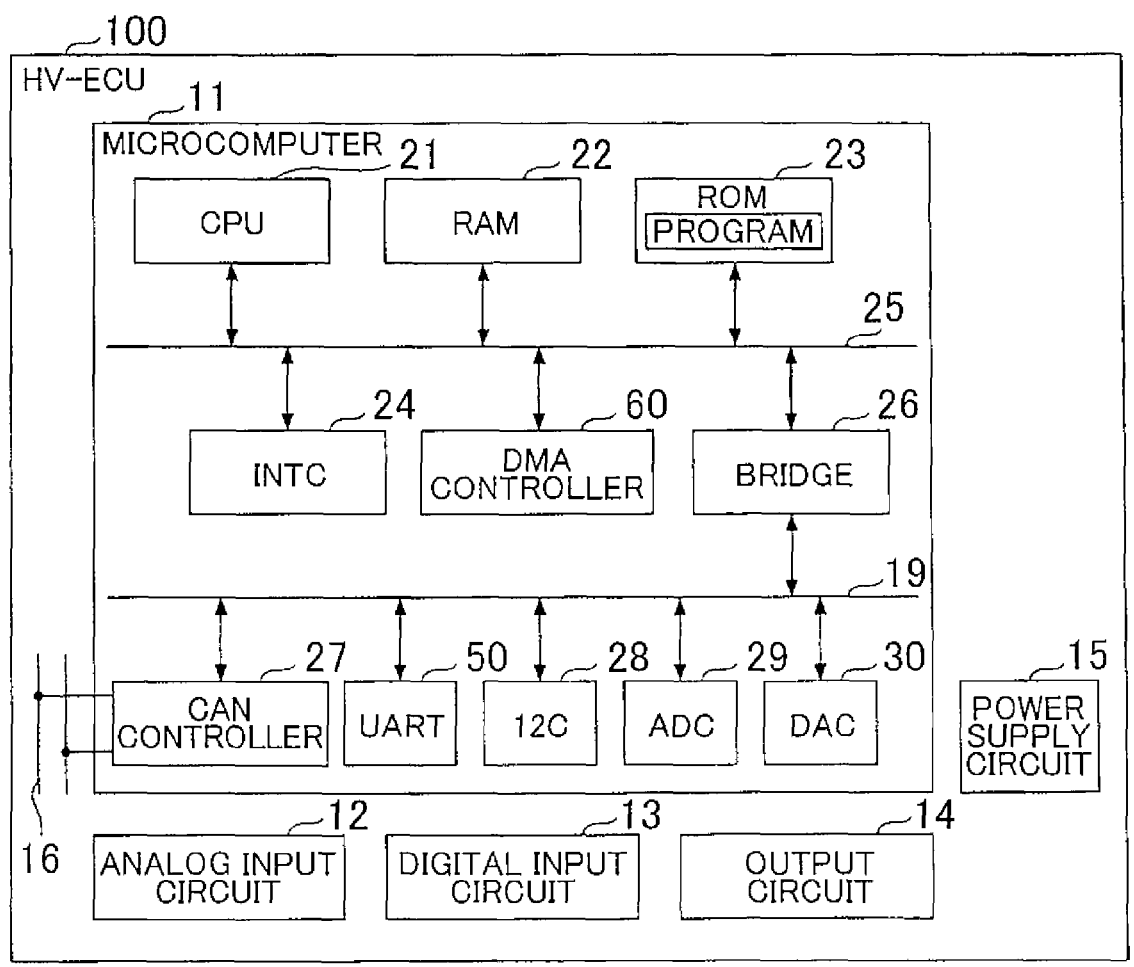
FIG. 3 is a diagram showing an example of a hardware configuration of the HV-ECU.

FIG. 3 is a diagram showing an example of the hardware configuration of the HV-ECU 100. The HV-ECU 100 mainly includes a microcomputer 11, an analog input circuit 12, a digital input circuit 13, an output circuit 14, and a power supply circuit 15. The analog input circuit 12 performs A/D conversion for analog signals output from various sensors and, at the same time, works as a multiplexer to selectively output A/D-converted signals to the microcomputer 11. The digital input circuit 13 works as a multiplexer to selectively output digital signals, output from various sensors, to the microcomputer 11. The output circuit 14 outputs control signals to the actuator in response to a request from the microcomputer 11.

The microcomputer 11 includes a CPU 21, a RAM 22, a ROM 23, an INTC 24, a DMA controller 60, a CAN controller 27, a UART 50, an inter-integrated circuit (I2C) 28, an ADC (A/D controller) 29, and a DAC (D/A controller) 30. The CPU 21, RAM 22, ROM 23, INTC 24, and DMA controller 60 are connected to a main bus 25. The CAN controller 27, UART 50, I2C 28, ADC 29, and DAC 30 are connected to a peripheral bus 19. The main bus 25 and the peripheral bus 19 are connected via a bridge 26.

The CPU 21 controls the whole HV-ECU 100 by executing the program stored in the ROM 23. The RAM 22 is a work memory used when the CPU 21 executes programs. The battery information 202, received by the UART 50, is transferred to the RAM 22 by the DMA controller 60. The ROM 23 stores the system software programs such as the operating system (OS), device drivers, and middleware.

The INTC 24 monitors the interrupt register, coordinates the interrupt requests from peripheral devices (such as the DMA controller 60, CAN controller 27, I2C 28, and ADC 29) according to the interrupt priority, and notifies the CPU 21 about those interrupts. In response to this notification, the CPU 21 executes the interrupt service routine (ISR) to start a task predefined for each of the peripheral devices from which the interrupt is received. Although the UART 50 is one of the peripheral devices, the UART 50 connected to the battery monitoring unit 200 does not issue an interrupt request in this embodiment.

The DMA controller 60 moves data between the RAM 22 and a peripheral circuit, or moves data within the RAM 22, not via the CPU 21. The DMA controller 60 will be described later.

The bridge 26 absorbs the difference in frequency between the main bus 25 and the peripheral bus 19 and connects the circuits, connected to the main bus 25, and the circuits, connected to the peripheral bus 19, so that they can communicate with each other. If multiple connection requests are issued from the circuits, connected to the main bus 25 or the peripheral bus 19, to the circuits connected to the other bus, the bridge 26 coordinates those multiple connection requests.

The CAN controller 27 is a communication circuit for communication with another ECU connected to a CAN bus 16. The CAN controller 27 selectively receives CAN frames, which flow in the CAN bus 16 and have pre-set IDs, and notifies the CPU 21 about those frames. In addition, when a data sending request notification is received from the CPU 21, the CAN controller 27 attaches its own ID to the data and sends it to the CAN bus 16.

The ADC 29 converts the analog signal of a sensor, connected not via the analog input circuit 12, to the digital signal and notifies the CPU 21 about the converted digital signal. The DAC 30 converts digital data to be sent to the CPU 21 via a request, to analog data and outputs the converted analog data to the actuator or the like.

The battery monitoring unit 200, a unit that monitors the state of the battery 300, regularly acquires the battery information 202 on all cells of the battery 300 from the battery 300 and stores the acquired information.

The state of a cell is identified by the value of electric current flowing in the cell, the voltage value of the cell, or the temperature of the cell. In this embodiment, these values are called the battery information 202. The HV-ECU 100 uses the battery information 202 to control the charging and discharging of each cell of the battery 300. For example, the HV-ECU 100 uses the battery information 202 to estimate the state of charge (SOC) of each cell, to estimate the deterioration state, or to determine the overcharge or over-discharge to perform control for reducing it.

The operation of the DMA controller 60 is controlled by control information that is stored in various registers. In the description below, a register in which control information is stored is called a control register.

FIG. 4A is a diagram showing an example of control information used by the DMA controller 60. The transfer device field stores an identification number used by the DMA controller 60 to identify a peripheral device when the DMA controller 60 controls the data transfer to and from multiple peripheral devices. In this embodiment, the transfer device field stores the identification number of the UART 50 to which the battery monitoring unit 200 is connected. The transfer source address field stores the address of the transfer source when the DMA controller 60 transfers data to the RAM 22. In this embodiment, the transfer source address field stores the address of the UART 50 to which the battery monitoring unit 200 is connected. For port-mapped I/O in which a peripheral device is identified by the identification information, the transfer source address field stores the identification information (alphabetic letter or numeric value) on the UART 50. For memory mapped I/O in which a peripheral device is identified in the same address space as that of the RAM 22, the transfer source address field stores the address of the UART 50. The transfer destination address field stores a data transfer destination address when the DMA controller 60 transfers data received by the UART 50. Because the CPU 21 uses the RAM 22 as a work memory, the transfer destination address is the address of a predetermined area in the RAM 22. The addressing mode field stores one of the following two option modes for specifying the transfer destination address: one is the mode in which the same address is constantly specified (constant address mode) and the other is the mode in which a larger address is specified according to the amount of data written in the RAM 22. In this embodiment, the addressing mode field stores the constant address mode. The element size field stores the information on size of a unit data. That is, the element size field stores the minimum size of data that can be transferred to the RAM 22. The transfer size field stores the size of data accumulated in the DMA buffer 61. For example, because the transfer size is 160 bytes in this embodiment, the DMA controller 60 transfers data to the RAM 22 when 160 bytes of data is accumulated in the DMA buffer 61.

When the microcomputer 11 is started, the CPU 21 sets the control information described above in a control register 63 of the DMA controller 60. After the control information is set in the control register 63, the DMA controller 60 transfers the data, received by the UART 50, to the RAM 22 according to the control information. After writing the data in the RAM 22, the DMA controller 60 notifies a reception interrupt request to the INTC 24 to allow the CPU 21 to read the data from the RAM 22.

The UART 50 can also send data. When sending data, the CPU 21 requests the DMA controller 60 to transfer the data written in the RAM 22. The DMA controller 60 reads the data from the RAM 22 and sets the data in the UART 50.

FIG. 4B is a diagram showing an example of control information used by the UART 50. The reception threshold field stores the data size specified by the UART 50 when a DMA request is sent to the DMA controller 60. The UART 50 stores the received data in the FIFO 51 in the order of reception, one byte at a time. When the size of data that is set in the reception threshold field is stored in the FIFO 51, the UART 50 sends a DMA request to the DMA controller 60. The minimum value of the reception threshold is one byte, and the maximum value is the size of the FIFO 51.

In this embodiment, the reception threshold affects the count value of the counter register 62. That is, the data is transferred from the UART 50 to the DMA buffer 61 the number of times, produced by dividing the transfer size by the reception threshold, until the data of the transfer size is accumulated in the DMA buffer 61. The counter register 62 stores number of times the data is transferred from the UART 50 to the DMA buffer 61. Therefore, for the same transfer size, the smaller the reception threshold is, the larger the maximum value of the counter register 62 is. That is, when the reception threshold is 1 byte, the maximum value of the counter register 62 is 160. When the reception threshold is 2 bytes, the maximum value of the counter register 62 is 80. When the reception threshold is 8 byte, the maximum value of the counter register 62 is 20. This means that the reception threshold must be smaller than the transfer size. In addition, the reception threshold must be set so that the value of the counter register 62 is changed during X milliseconds of the monitoring interval that will be described later. In many cases, any of those conditions is satisfied by the capacity of the FIFO 51 or the communication speed of the UART 50 and so the reception threshold should be reduced if necessary.

The mode field stores the information specifying whether the UART 50 sends a DMA request to the DMA controller 60 or sends a reception interrupt directly to the INTC 24. In this embodiment, the mode (=1) in which the UART 50 sends a DMA request to the DMA controller 60 is set.

FIG. 5 is a diagram showing an example of the functional block of the HV-ECU 100. As described above, the UART 50 stores one byte of data, received from the battery monitoring unit 200, in the FIFO 51. Each time one byte of data is received, the UART 50 sends a DMA request to the DMA controller 60.

The DMA controller 60 includes a DMA buffer 61, control register 63, and counter register 62. In response to the DMA request received from the UART 50, the DMA controller 60 stores the data, received from the FIFO 51, in the DMA buffer 61, one byte at a time. At this time, the DMA controller 60 increments the count value of the counter register 62 by one. When the count value in the counter register 62 matches the transfer size (for example, 160 bytes) in the control register 63, the DMA controller 60 transfers 160 bytes of data, accumulated in the DMA buffer 61, to the RAM 22. The DMA controller 60 sends an interrupt request to the INTC 24 and, at the same time, initializes the value of the counter register 62 to zero. The same processing may be performed by counting, not the number of times one byte of data is stored in the DMA buffer 61, but the data amount (number of bytes).

The HV-ECU 100 includes a DMA setting unit 31, a count value monitoring unit 32, a count-unchanged-time measuring unit 33, a non-communication interval determination unit 34, and a HV-battery monitoring unit 35. The DMA setting unit 31, count value monitoring unit 32, count-unchanged-time measuring unit 33, non-communication interval determination unit 34, and HV-battery monitoring unit 35 are implemented by the CPU 21 executing programs to work with the hardware. The DMA setting unit 31 sets the control information, shown in FIG. 4A, in the control register 63. The setting contents are described, for example, in the program.

The count value monitoring unit 32 regularly or periodically monitors the count value of the counter register 62. If the count value is equal to the previous value, the count value monitoring unit 32 causes the count-unchanged-time measuring unit 33 to increment the count-unchanged-time count value. If the count value is not equal to the pervious value, the count value monitoring unit 32 clears the count-unchanged-time count value.

If the count-unchanged-time count value exceeds a predetermined threshold (N times), the non-communication interval determination unit 34 determines that a current interval is a non-communication interval (in other words, the battery monitoring unit 200 is not sending the battery information 202 due to the non-communication interval) to detect the non-communication interval. If the count value monitoring cycle is almost periodic, the count-unchanged-time count value has information equivalent to the count-unchanged-time.

If it is determined that the current interval is the non-communication interval, the non-communication interval determination unit 34 sends the non-communication interval detection result to the HV-battery monitoring unit 35. When the non-communication interval detection result is acquired, the HV-battery monitoring unit 35 then identifies that data, which is read from the RAM 22 when the DMA controller 60 first generates the reception interrupt, as the beginning data of the battery information 202 on the whole battery 300. After that, the HV-battery monitoring unit 35 calculates the SOC of each cell of the battery 300 based on the battery information 202 and performs the charge/discharge control described above.

FIG. 6A is a diagram showing the conventional non-communication interval detection method illustrated for comparison purposes. The conventional UART 50 sends the reception interrupt to the CPU 21 each time one byte of data is received. By appropriately setting the communication speed (baud rate [bps]), about W milliseconds are required to send one byte of data except the start bit and the stop bit (one byte/1 millisecond in the figure).

a1. As shown in the figure, one byte of data is received for each W milliseconds and T/W reception interrupts are generated for T milliseconds.

a2. To detect a non-communication interval, the HV-ECU 100 counts the number of reception interrupts. The HV-ECU 100 counts the number of reception interrupts, for example, by incrementing the number of times by one each time a predetermined task is called by the reception interrupt.

a3. Regardless of whether the reception interrupt is generated, a predetermined task regularly references the count value of reception interrupts and compares the referenced value with the previous value. The HV-ECU 100, which knows that the non-communication interval is T milliseconds in length, can detect the non-communication interval because the count value is not updated for a time slightly shorter than T milliseconds (40%-90% of T milliseconds).

a4. After the non-communication interval is detected, the HV-ECU 100 can identify that the next first reception interrupt indicates the beginning data of the battery information 202. From that point, the HV-ECU 100 receives data on each cell and identifies that the data to the next non-communication interval is the battery information 202 on the whole battery.

FIG. 6B is a diagram showing an example of an inconvenience caused by the conventional non-communication interval detection method when the amount of the battery information 202 is increased. In FIG. 6B, the communication speed is increased about 20 times as compared to that in FIG. 6A to cope with an increase in the battery information 202. That is, 20 pieces of data are received in the W-millisecond interval in the figure.

In FIG. 6B, the DMA controller 60 transfers data from the DMA buffer 61 to the RAM 22 every 160 bytes to prevent the processing load of the CPU 21 from being increased by the reception interrupt. Therefore, the reception interrupt is generated once for about T milliseconds.

b1. In the communication state shown in FIG. 6B, the count value of the number of reception interrupts is increased once for T milliseconds. As shown in the figure, the reception interrupt is generated when T milliseconds elapse after the T-millisecond non-communication interval.

b2. Because the reception interrupt is generated once for, T milliseconds, the HV-ECU 100 cannot determine whether, for T milliseconds, the count value is not increased because the interval is a non-communication interval or because the UART 50 receives data but T milliseconds have not elapsed.

The number of reception interrupts that is not generated because of a non-communication interval is only one. It is not impossible to detect that the count is not increased by one. However, in some cases, the reception interrupt generated by the DMA controller 60 cannot be detected or a count error is generated because of a noise or a high processing load of the CPU 21. In such a case, the start of data is detected incorrectly.

b3. If the reception interrupt interval becomes longer than the assumed value (T milliseconds) (one reception interrupt is not generated), the HV-ECU 100 may identify the start of data when the next first reception interrupt is generated. However, the data may be shifted, for example, when the battery monitoring unit 200 generates a short non-communication interval at a position that is not the start of data. Therefore, the accuracy of this method for detecting the beginning data is low.

FIGS. 7A and 7B are diagrams showing an example of the non-communication interval detection method in this embodiment. The communication condition is the same as that in FIG. 6B. That is, the HV-ECU 100 receives 20 times as much data as in the conventional method for W milliseconds, and the DMA controller 60 generates the reception interrupt once (for example, when 160 bytes of battery information 202 are received) for T milliseconds.

c1. Because the reception threshold of the UART 50 is one byte in this embodiment, the count value of the counter register 62 of the DMA controller 60 is incremented by one each time the UART 50 receives one byte.

c2. In the non-communication interval, the count value is not increased and, therefore, remains zero. In this specification, the state in which the count value does not change is called "count-unchanged".

c3. The count-unchanged-time measuring unit 33 measures the count-unchanged time and therefore, when the count-unchanged time exceeds the threshold, the non-communication interval determination unit 34 determines that a current interval is a non-communication interval.

Thus, the HV-ECU 100 can detect the non-communication interval before the UART 50 receives the first one-byte data of the battery information 202. The 160 bytes of data, transferred from the DMA buffer 61 to the RAM 22 when the first reception interrupt is generated after the non-communication interval, is the beginning data of the battery information 202.

As shown in FIG. 7B, the DMA controller 60 may detect that the data of the transfer size is stored in the DMA buffer 61 when the count value of the counter register 62 is decreased to zero. In this case, though the count value remains constant at 160 bytes in the non-communication interval, the count value monitoring unit 32 similarly detects that the count value does not change and then causes the count-unchanged-time measuring unit 33 to count the count-unchanged time.

In the example given above, the non-communication interval and the reception interrupt interval are both T milliseconds in length. The non-communication interval and the reception interrupt are not limited to this time. The non-communication interval detection method in this embodiment is efficient if the non-communication interval and the reception interrupt interval are set in which one or two interrupts are generated in the non-communication interval. That is, the reception interrupt interval is assumed about 50% to 100% of the non-communication interval.

Figure 8:
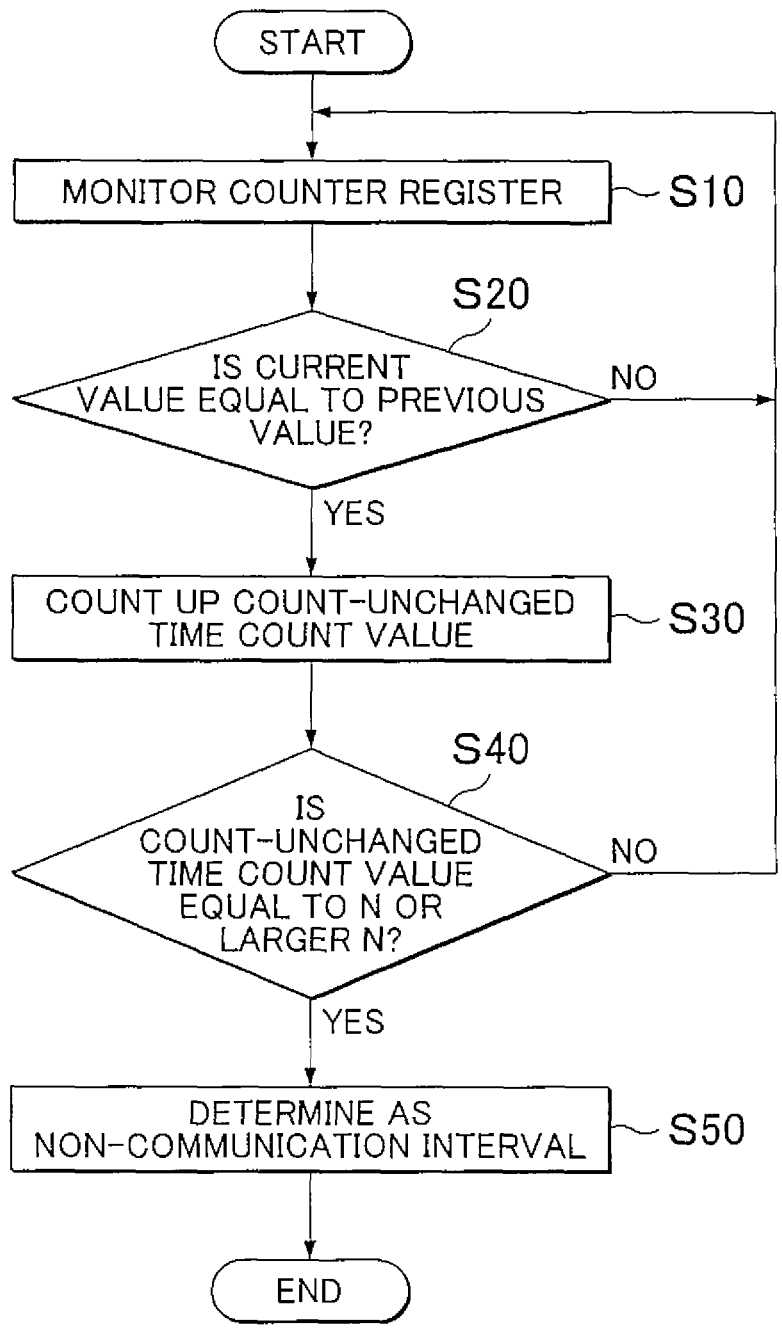
FIG. 8 is a flowchart showing an example of the non-communication interval detection procedure used by the HV-ECU in this embodiment.

FIG. 8 is a flowchart showing an example of the non-communication interval detection procedure used by the HV-ECU 100 in this embodiment. The procedure in FIG. 8 is executed repeatedly after the CPU 21 sets the control information in the control register 63 of the DMA controller 60.

The battery monitoring unit 200 sends the battery information 202, and the UART 50 of the HV-ECU 100 receives the data serially. The DMA controller 60 stores data, received from the FIFO 51, in the DMA buffer 61 and updates the count value of the counter register 62.

The count value monitoring unit 32 regularly monitors the count value by polling (S10). The monitoring interval (polling interval) is set to X milliseconds in the description below. It is desirable that the monitoring interval be the half or lower than the non-communication interval, that is, the monitoring interval be the length of time within which the count value can be referenced at least two or three times within the non-communication interval. On the other hand, it is desirable that the monitoring interval be shorter because the shorter the monitoring interval is, the more frequently the count-unchanged state is referenced. Note that, however, the monitoring interval, if too short, increases the processing load of the CPU 21. For example, when the monitoring interval X is set to T/4 milliseconds, the count value can be referenced three or four times within the non-communication interval. In this manner, the monitoring interval may be appropriately set considering the length of the non-communication interval and the processing load of the CPU 21.

Next, the count value monitoring unit 32 determines whether the recorded count value that is referenced last (hereinafter called the previous value) is equal to the count value that is read in S10 (hereinafter the current value) (S20).

If the previous value and the current value are not equal (No in S20), the count value monitoring unit 32 monitors the counter register 62 repeatedly because the count value is not in the count-unchanged state. The count value monitoring unit 32 updates the previous value with the current value. In addition, the count value monitoring unit 32 causes the count-unchanged-time measuring unit 33 to clear the count-unchanged time count value.

If the previous value and the current value are equal (Yes in S20), the count value monitoring unit 32 sends a count-up request, which increases the count-unchanged time count value, to the count-unchanged-time measuring unit 33 (S30) because there is a possibility that the count value is in the count-unchanged state. In response to this count-up request, the count-unchanged-time measuring unit 33 counts up the count-unchanged time count value.

Next, the non-communication interval determination unit 34 determines whether the count-unchanged time count value is equal to or larger than N (S40). N is a threshold used to determine that the count value remains unchanged, for example, N is the number of times corresponding to 40% to 90% of the time of the non-communication interval. It is desirable that the lower limit value of the threshold N be two or larger so that the count value monitoring unit 32 can detect that the count value remains unchanged at least twice. The upper limit value of the threshold N is four or smaller when the monitoring interval X is set to T/4 milliseconds. Therefore, when the non-communication interval is T milliseconds and the monitoring interval X is T/4 milliseconds, the threshold N=3 (75% of non-communication interval when X=T/4). In this manner, the threshold N may be appropriately set according to the monitoring interval X and the length of the non-communication interval.

If the count-unchanged time count value is not N or larger (No in S40), the count value monitoring unit 32 monitors the counter register repeatedly. Therefore, when the count value remains unchanged, the count-unchanged time count value is incremented by one.

If the count-unchanged time count value is N or larger (Yes in S40), the non-communication interval determination unit 34 determines that a current interval is the non-communication interval (S50). The non-communication interval determination unit 34 notifies the result of non-communication interval detection to the HV-battery monitoring unit 35. When this notification is received, the HV-battery monitoring unit 35 monitors the battery 300 assuming that the data, read from the RAM 22 upon detecting the next reception interrupt, is the beginning data of the battery information 202.

As described above, the HV-ECU 100 in this embodiment can detect a non-communication interval more accurately by monitoring the count value of the number of data pieces accumulated in the DMA buffer 61. In addition, because the non-communication interval need not be extended, the HV-ECU 100 neither decreases the battery information transmission efficiency nor increases the reception interrupt frequency, thus preventing an increase in the processing load of the CPU 21.

The amount of the battery information 202 of the whole battery may vary according to the type of the battery 300. However, the data received from the time a non-communication interval is detected to the time the next non-communication interval is detected is the battery information 202 on the whole battery, the non-communication interval detection method need not be changed even if the type of the battery 300 is changed.

As in the conventional method, the HV-ECU 100 allows communication to be carried out using the UART 50. That is, the HV-ECU 100 eliminates the need to perform handshaking (connection establishment) with the UART 50 of the HV-ECU 100 and the UART 50 of the battery monitoring unit 200 connected to each other via a synchronization line. Thus, no additional cost is required.

The non-communication interval detection method in this embodiment is applicable to communication via RS232C, which is a communication standard conforms to, EIA232. In addition, the non-communication interval detection method in this embodiment is applicable to communication using Universal Synchronous Asynchronous Receiver Transmitter (USART), I2C, and Serial Peripheral Interface (SPI) that have a clock line for synchronization.

What is claimed is:

1. A serial communication device comprising:
   a receiving unit configured to repeatedly receive a sequence of data including a plurality of pieces of data from a sending source;
   a data transfer unit configured to repeat storing a predetermined unit of data, received by the receiving unit, in a receiving buffer and transfer data from the receiving buffer to a storage unit when data of a predetermined size is accumulated in the receiving buffer;
   a counting unit configured to count one of a number of times the predetermined unit of data is stored in the receiving buffer and an amount of data accumulated in the receiving buffer;
   a monitoring unit configured to monitor, according to a monitoring interval, a count value counted by the counting unit, the monitoring interval being less than or equal to half of a duration of a non-communication interval in which the sending source does not send data; and
   a data identifying unit configured to, in response to the count value counted by the counting unit remaining unchanged during the duration of a non-communication interval, determine that a current interval is the non-communication interval and identify first data, received by the receiving unit after determining that the current interval is the non-communication interval, as beginning data of the sequence of data.

2. The serial communication device according to claim 1, wherein the non-communication interval is longer than an interval at which the predetermined unit of data received by the receiving unit is stored in the receiving buffer.

3. The serial communication device according to claim 1, wherein:
   the data transfer unit is configured to send an interrupt to a central processing unit when data is transferred from the receiving buffer to the storage unit; and
   the non-communication interval is substantially equal in length to one of a time required for the data of a predetermined size to be accumulated in the receiving buffer and a transfer interval at which the data transfer unit transfers data from the receiving buffer to the storage unit.

4. The serial communication device according to claim 1, wherein the data identifying unit is configured to determine that the current interval is the non-communication interval before the non-communication interval is ended.

5. The serial communication device according to claim 1, wherein the data transfer unit is a direct memory access controller and the receiving unit is a universal asynchronous receiver transmitter.

6. The serial communication device according to claim 1, wherein:
   data received by the receiving unit is battery information on a battery of a vehicle; and
   the serial communication device is an electronic control unit for a vehicle.

7. The serial communication device according to claim 1, wherein the sequence of data is repeatedly sent with the non-communication interval intervened.

8. The serial communication device according to claim 1, wherein:
   the monitoring unit is configured to monitor the count value at a predetermined monitoring interval; and
   the monitoring interval is shorter than a half of the non-communication interval.

9. A serial communication system comprising:
   a sending device configured to repeatedly send a sequence of data including a plurality of pieces of data with a non-communication interval intervened, the non-communication interval being an interval during which data is not sent; and
   a receiving device configured to receive the sequence of data sent from the sending device, the receiving device including:
   a data transfer unit configured to repeat storing a predetermined unit of data, received from the sending device, in a receiving buffer and transfer data from the receiving buffer to a storage unit when data of a predetermined size is accumulated in the receiving buffer;
   a counting unit configured to count one of a number of times the predetermined unit of data is stored in the receiving buffer and an amount of data accumulated in the receiving buffer;
   a monitoring unit configured to monitor, according to a monitoring interval, a count value counted by the counting unit, the monitoring interval being less than or equal to half a duration of the non-communication interval; and
   a data identifying unit configured to, in response to the count value counted by the counting unit remaining unchanged during the duration of a non-communication interval, determine that a current interval is the non-communication interval and identify first data, received by the receiving device after determining that the current interval is the non-communication interval, as beginning data of the sequence of data.

10. A serial communication method comprising:
receiving from a sending source a sequence of data including a plurality of pieces of data repeatedly;
repeating storing a predetermined unit of data, received from the sending source, in a receiving buffer;
transferring data from the receiving buffer to a storage unit when data of a predetermined size is accumulated in the receiving buffer;
counting one of a number of times the predetermined unit of data is stored in the receiving buffer and an amount of accumulated data accumulated in the receiving buffer;
monitoring, according to a monitoring interval, a count value generated by counting the one of the number of times of storing and the amount of accumulated data, the monitoring interval being less than or equal to half of a duration of a non-communication interval in which the sending source does not send data;
determining that a current interval is a non-communication interval during which the sending source does not send data if the count value remains unchanged during the duration of the non-communication interval; and
identifying first data, received after it is determined that the current interval is the non-communication interval, as beginning data of the sequence of data.

11. The serial communication device according to claim 1, wherein the counting unit is configured to count the amount of data accumulated in the receiving buffer.

12. The serial communication system according to claim 9, wherein the counting unit is configured to count the amount of data accumulated in the receiving buffer.

13. The serial communication method according to claim 10, the method includes counting the amount of accumulated data accumulated in the receiving buffer.

* * * * *